United States Patent

[11] 3,630,246

[72] Inventor Douglas D. Hamilton
    Mount Royal, Canada
[21] Appl. No. 28,241
[22] Filed Apr. 17, 1970
[45] Patented Dec. 28, 1971
[73] Assignees Canadian International Paper Company;
    Quebec North Shore Paper Company
    Montreal, Quebec; Abitibi St. Anne Paper
    Ltd., Beaupre, Quebec, Canada, part
    interest to each
    Continuation of application Ser. No.
    695,453, Jan. 3, 1968, now abandoned.
    This application Apr. 17, 1970, Ser. No.
    28,241

[54] MODIFIED SKIDDER AND FELLING HEAD
    8 Claims, 9 Drawing Figs.
[52] U.S. Cl. .................................................. 144/3 D,
    144/34 R, 214/3
[51] Int. Cl. ..................................................... A01g 23/02

[50] Field of Search............................................. 144/309
    AC, 2 Z, 3 D, 34 R, 34 E; 214/3, 147, 147 G, 147
    T, 523

[56] References Cited
    UNITED STATES PATENTS
    3,527,271  9/1970  Chateauneuf................ 144/3 D Primary Examiner—Gerald A. Dost
Attorney—Jacobi, Lilling & Siegel ABSTRACT: A vehicle for use, in field logging operations, which includes a self-propelled tractor unit having an extendible and retractable boom pivotally mounted for slewing about a vertical axis and including a felling head mounted on the boom, such felling head including a grapple for grasping a standing tree and a shear for severing the grasped tree. The vehicle also includes a bunk assembly having tongs movable selectively for anchoring the butt end of trees thereto so that the vehicle can skid the anchored trees to a selected site. The boom is movable and positioned such that a standing tree can be severed by the felling head and thereafter loaded onto the bunk while being continuously engaged by the grapple.

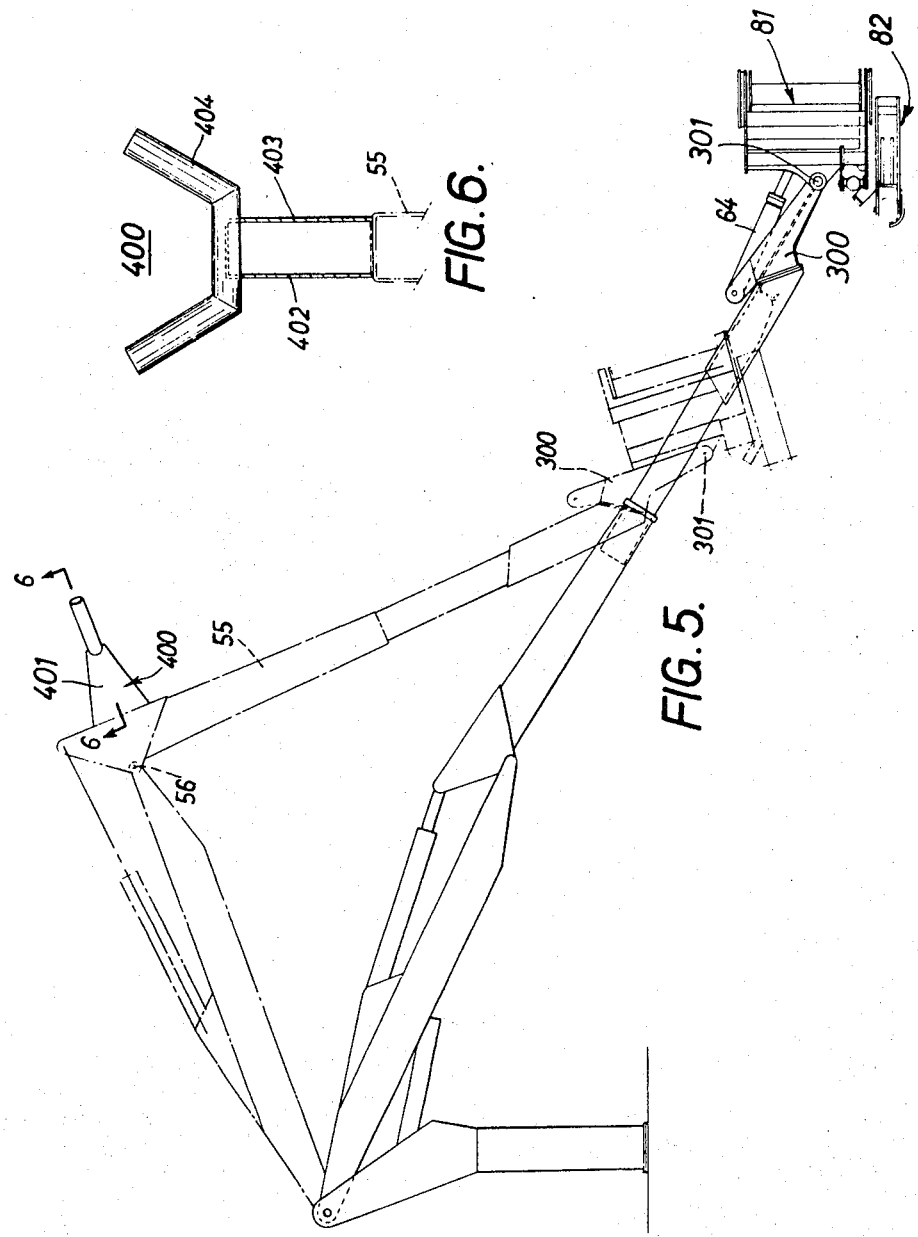

MODIFIED SKIDDER AND FELLING HEAD

This application is a continuation of Ser. No. 695,453, filed Jan. 3, 1968, and now abandoned.

This invention relates to a machine for use in handling trees in a wooded area and particularly to a mobile vehicle for felling trees, loading the felled trees onto a bunk on the vehicle and for skidding the load of trees to a selected site. For convenience, the machine will be referred to hereinafter as a feller-self-loading skidder. The machine includes in combination a mobile vehicle; an extendible and retractable boom mounted on the vehicle; a felling head mounted on the boom and consisting of a grapple adapted to engage a tree and means to sever the engaged tree; and, a bunk mounted on the vehicle and having a plurality of means associated therewith for selectively anchoring trees placed thereon by the boom and grapple.

Log skidding vehicles of the self-loading type are known as exemplified by U.S. Pat. No. 3,227,295 issued Jan. 4, 1966, consisting of a tractor having a bunk, and a boom and grapple assembly arranged such that the boom and grapple can pick up felled trees and load the same onto the bunk. A vehicle of this type facilitates logging operations and is a major contribution to the mechanization of logging in the field. A vehicle of this type, however, requires felling the trees before they can be picked up and loaded onto the bunk. Felling, in accordance with known techniques, may either be accomplished by hand operation, for example, using chain saws, or a separate vehicle having a felling head thereon. A typical type of vehicle for felling trees only is found in Rehnstrom's Canadian Pat. No. 723,956 issued Dec. 21, 1965. Vehicles of the latter type, however, are not capable of collecting a plurality of trees nor are they capable of skidding felled trees to a selected site.

It is an object of the present invention to provide an improved self-loading skidder vehicle whereby standing trees may be severed and, without disengaging the severed tree, load the same onto the bunk on the vehicle.

A still further object of the invention is to provide a feller-self-loading skidder which is highly maneuverable, one that can not only operate on relatively rough terrain but also one that is highly maneuverable in its capabilities for collecting sparsely located trees.

The maneuverability in the sense of mobility on rugged terrain is provided by an articulated wheeled vehicle. Although it has been known to use articulated vehicles in logging operations as exemplified by Canadian Pat. No. 659,445 issued Mar. 12, 1963, there has not, until the present invention, been proposed a feller-self-loading skidder where the vehicle is of the articulated type. The vehicle disclosed in such patent includes a boom and grapple assembly mounted on the vehicle and located so as to load felled trees onto a bunk assembly which is rigidly attached to one of the frame portions of the articulated vehicle. Maneuverability in the sense of collecting a plurality of sparsely located trees is provided by having a plurality of means associated with the bunk for selectively engaging a plurality of trees. The bunk is preferably pivotally mounted for movement about a vertical axis which facilitates maneuverability of the vehicle during skidding a group of trees anchored thereto. The present invention also represents an improvement over the latter patented type of structure by including a shear mechanism associated with the grapple whereby standing trees may be felled and without disengaging the same thereafter loaded onto the bunk on the vehicle.

In accordance with the present invention, there is provided an improved machine for handling trees which consists of a self-propelled mobile vehicle, an extendible and retractable boom pivotally mounted on the said vehicle and having a grapple and shear mounted thereon respectively for engaging and severing a tree, a bunk mounted on said vehicle to receive trees loaded thereon by the boom and grapple assembly, and means associated with the bunk selectively to anchor the trees thereto.

In a more restricted form of the invention, the self-propelled mobile vehicle is an articulated wheeled vehicle and in a still further restricted form of the invention, the bunk is pivotally mounted on the articulated wheeled vehicle for movement about a substantially vertical axis.

In accordance with a still further aspect of the present invention, there is provided a modified rear chassis for use in an articulated vehicle whereby such articulated vehicle is adapted for use in handling felled trees, said chassis including a frame, at least one pair of wheels supporting said frame, means adjacent one end of said frame pivotally to connect the frame to a further frame portion to form a vehicle wherein there is controlled articulated movement of the interconnected frames relative to one another, a bunk support assembly secured to said frame adjacent the other end thereof, means associated with said support assembly pivotally to mount a bunk assembly thereon, and means for journaling a post on said frame in horizontal spaced relation with respect to a bunk pivotally mounted on said bunk support assembly, said post being adapted for selected pivotal movement about a substantially vertical axis.

In a still more restricted form of the present invention, there is provided an articulated vehicle having a pair of chassis pivotally interconnected for articulated movement relative to one another about a substantially vertical axis, the trailing frame portion of said vehicle including a frame assembly supported upon at least one pair of wheels and having a bunk pivotally secured thereto adjacent the trailing end thereof, means associated with the bunk selectively to engage a plurality of trees supported by the bunk and a post journaled on said frame in spaced relation with respect to said bunk for selected pivotal movement about a substantially vertical axis, means to drive and control operation of said vehicle and means selectively to pivot said post about said axis.

The invention is illustrated by way of example in the accompanying drawings wherein:

FIG. 5 is a partial rear elevational view of the vehicle illustrated in FIGS. 1, 2 and 3;

FIG. 6 is a section along line 6—6 of FIG. 5;

Figure 1:
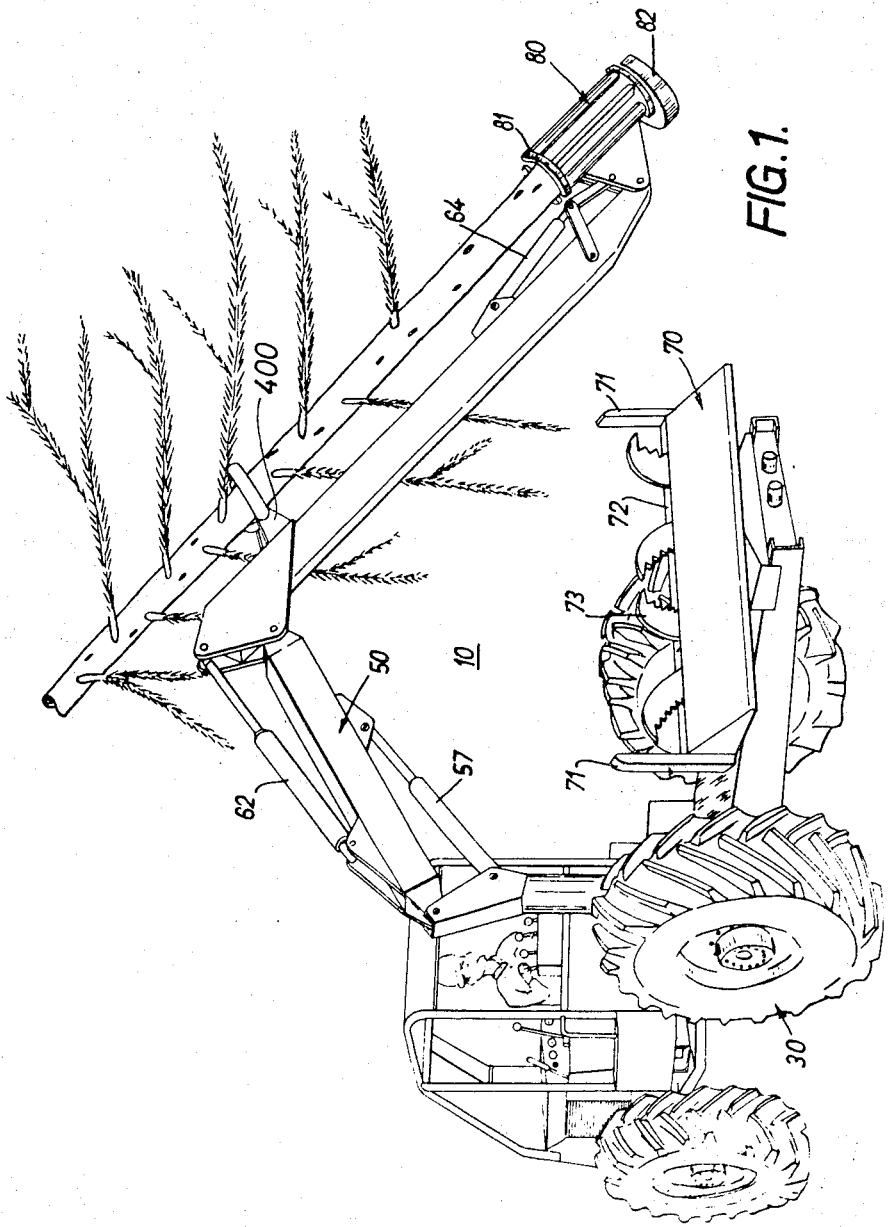
FIG. 1 is an oblique, diagrammatic illustration of a vehicle constructed in accordance with the present invention.

Referring now in detail to the drawings, shown in FIG. 1 is a tree feller-self-loading skidder vehicle 10 consisting of an articulated self-propelled vehicle 30 having a knuckle boom 50 and a tree bunk assembly 70, each pivotally mounted thereon, the boom and bunk pivot axes being disposed in horizontal spaced relation with respect to one another. The articulated vehicle 30 includes a front frame assembly or chassis 31 and a rear frame assembly or chassis 32 pivotally interconnected by a pair of pins 33 and 34 whereby the frame assemblies are adapted to pivot with respect to one another about a substantially vertical axis 35. Each of the frame assemblies 31 and 32 is supported upon a pair of ground-engaging wheels 36.

Figure 2:
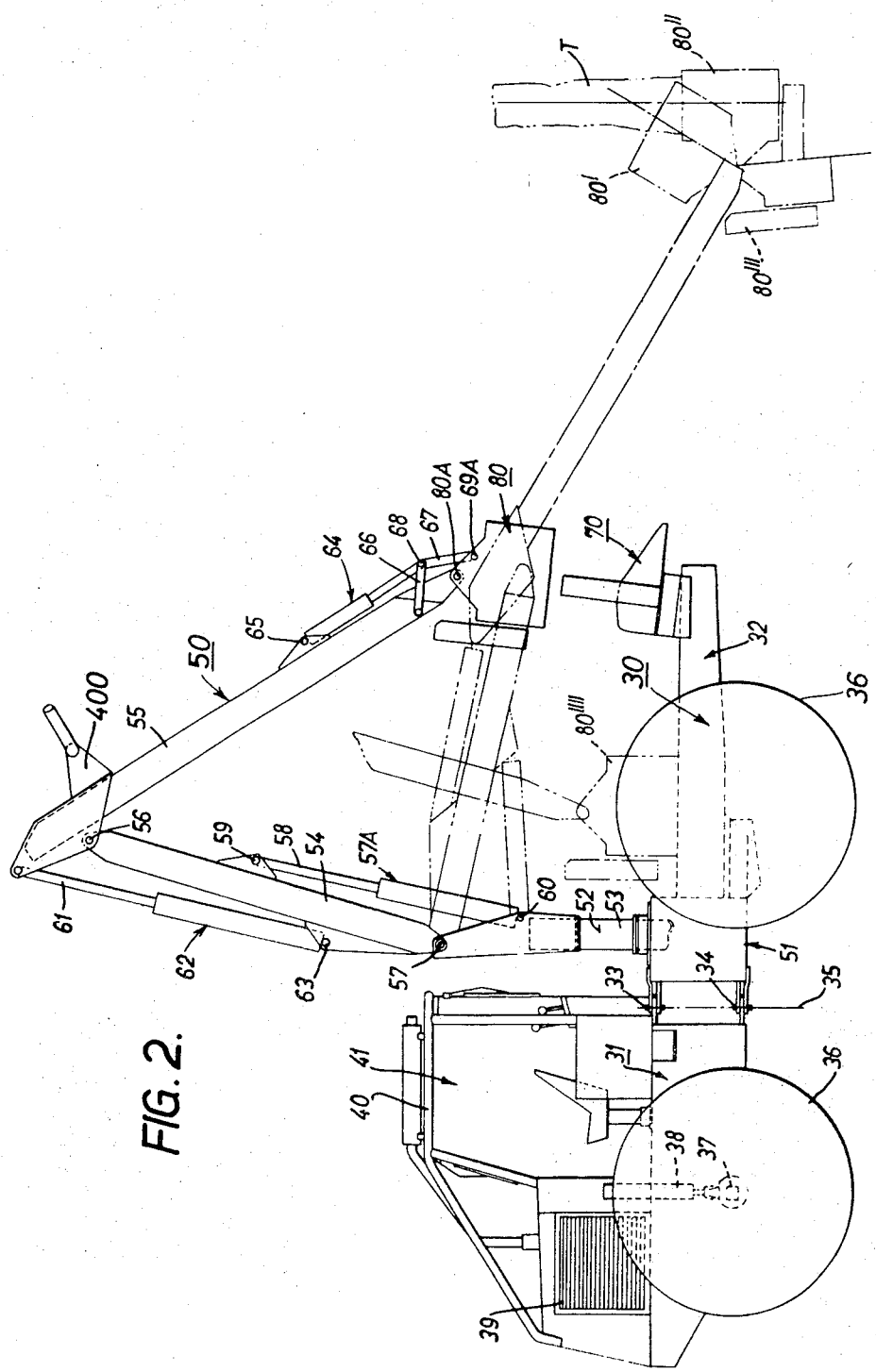
FIG. 2 is a side elevational view of the vehicle illustrated in FIG. 1.

As will be seen in FIG. 2, the pair of wheels 36 supporting the front chassis is connected to the frame 31 by an axle 37 adapted to pivot about an axis parallel to the longitudinal axis of the vehicle. The pivotal connection of the axle 37 permits the front frame 31 to roll and control of such roll is effected by a pair of stabilizer cylinders 38. The frame 31 supports a motor 39 for use in driving the vehicle through the wheels 36.

A suitable transmission assembly for such drive is provided, but not shown in the drawings. The front frame 31 supports an open cab 40 surrounding the operator's control position 41 wherein suitable controls and seating for the operator are provided. The controls consist of levers for actuating valves in the hydraulic system to control operation of the various components as will be seen hereinafter, as well as other instruments and controls common to powered vehicles.

The wheels 36, supporting the rear frame 32, are secured rigidly thereto by a transversely disposed axle 38A. Mounted on the frame 32 adjacent the rear end thereof is a tree bunk assembly 70. The bunk assembly includes a pair of upstanding arms 71 located one at each end of the bunk and intermediate such arms is a relatively flat horizontal portion 72. A plurality of tongs or arms 73 are pivotally mounted on the bunk and are arranged selectively to engage trees on the bunk at horizontally spaced position thereon, and thereby selectively anchor a plurality of trees to the vehicle for skidding purposes. The arms or tongs 73 are hydraulically controlled as will be seen hereinafter and because of this and further because of there being a plurality of arms, the vehicle is adapted to operate rapidly even in picking up sparsely located trees.

Figure 7:
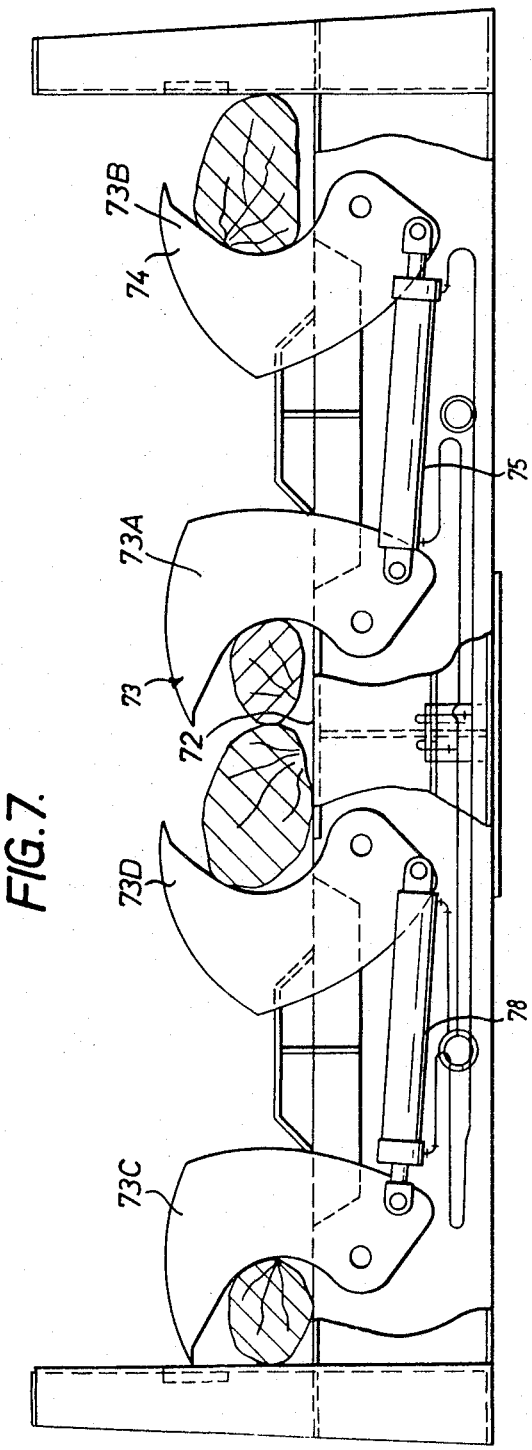
FIG. 7 is a partial sectional, rear elevational view of the bunk assembly pivotally mounted on the vehicle illustrated in FIG. 1.

The bunk assembly is more fully illustrated in FIG. 7 and includes a pair of arms 73A and 73B interconnected by a hydraulic cylinder 75 and a pair of arms 73C and 73D interconnected by a hydraulic cylinder 78. The hydraulic circuit of the pair of cylinders 75 and 78 is such that the movement of the arms 73A, B, C and D is interrelated as will be seen hereinafter with reference to the description of the hydraulic schematic in FIG. 8.

Figure 3:
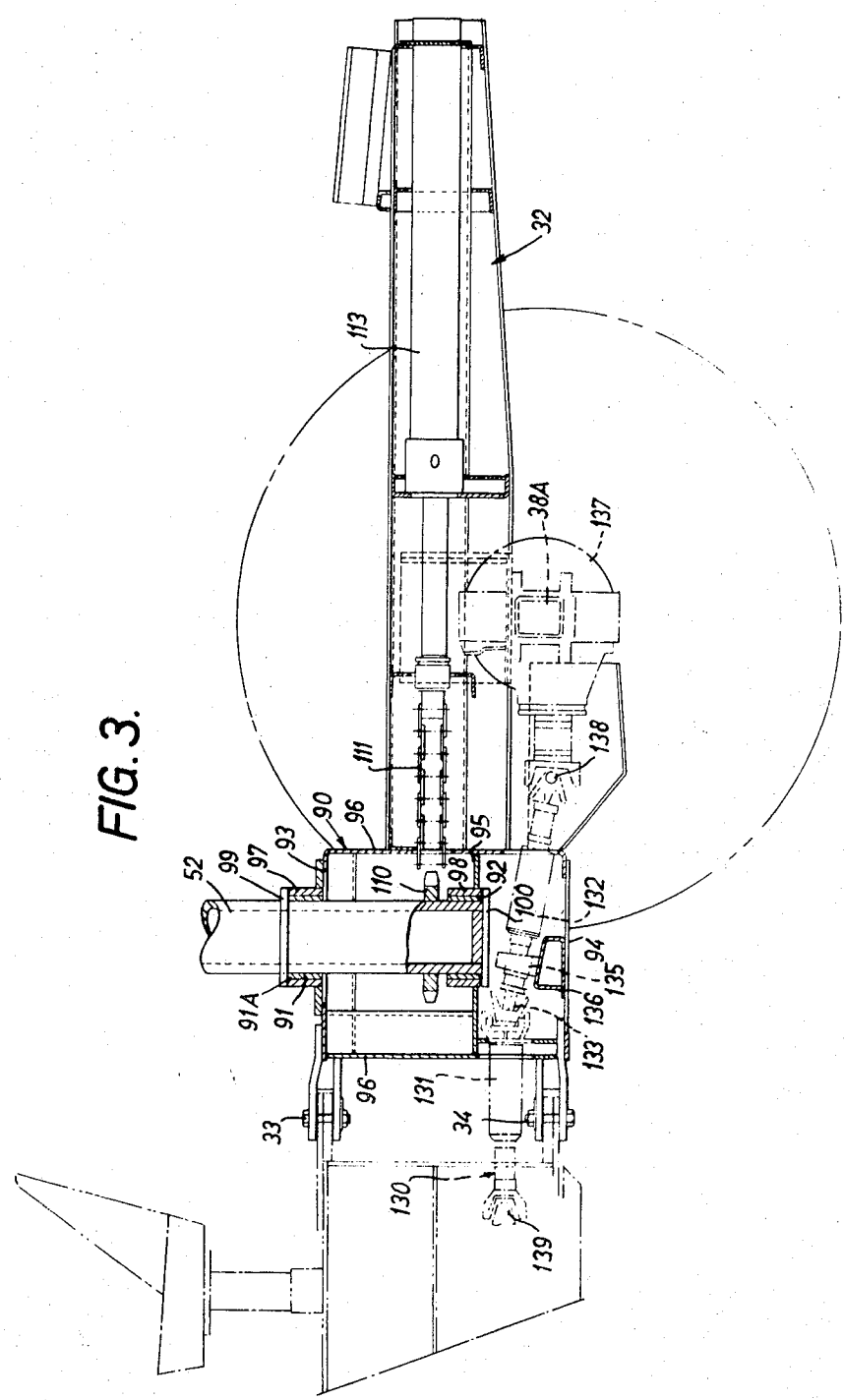
FIG. 3 is a vertical, partial cross-sectional view of a rear chassis constructed in accordance with one aspect of the present invention and for use in constructing an articulated vehicle, specifically for use with a boom and grapple assembly.

The boom 50 illustrated is a knuckle boom mounted on the frame 32 to pivot about a substantially vertical axis. The knuckle boom illustrated is a typical assembly which may be purchased from the John Deere Company and is known by the trade name "ROTOBOOM." The unit may be purchased for direct mounting on a vehicle and consists of a lower mount and pivotal assembly 51 with a post or mast 52 projecting upwardly therefrom and journaled for selective pivotal movement about a vertical axis 53. In the case of purchasing the John Deere unit, the lower mount and pivotal assembly 51 may be detachably secured to the chassis by bolts or it may be permanently secured by welding or some other suitable anchoring means. In the case of the John Deere assembly, mechanism for effecting oscillation of the mast about the vertical axis is enclosed within the mount and pivot assembly 51. As will be seen hereinafter, a further modified mount and actuating mechanism is illustrated in FIG. 3.

The boom further includes lever arms 54 and 55 pivotally interconnected by a pivot pin 56. The arm 54 is pivotally connected at the other end to the post 52 by a pivot pin 57. The lever arm 55 has a felling head assembly 80 pivotally secured thereto by a pin 80A at a position adjacent the free end thereof. The post 52 and lever 54 are interconnected by a hydraulic cylinder assembly 57A. The piston rod 58 of the hydraulic cylinder assembly 57 is pivotally secured to the lever arm 54 by a pivot pin 59 and the cylinder is pivotally secured to the post by a pivot pin 60. The pivot pins 59 and 60 are located in selected spaced relation with respect to the pivot pin 57. The lever 55 has a portion thereof projecting beyond the pivot pin 56 and pivotally secured to such extending portion is a piston rod 61 of a hydraulic cylinder assembly 62. The cylinder portion of the hydraulic cylinder assembly 62 is pivotally secured by a pin 63 to the lever 54. A further hydraulic cylinder assembly 64 is pivotally secured at one end by a pin 65 to the lever 55 and at the other end, to a scissor assembly consisting of levers 66 and 67 by a pin 68. The levers 66 and 67 are pivotally secured at their opposite ends respectively to the lever arm 55 of the boom by a pivot pin 69 and to the felling head assembly 80 by a pivot pin 69A.

The boom may be extended and retracted by appropriate fluid control in the hydraulic cylinder assemblies 57A and 62. The felling head assembly 80 may also be pivoted about the pin 80A which mounts the felling head on the boom lever arm 55 by appropriate control of fluid in the hydraulic cylinder assembly 64.

The maximum reach of the boom is dependent upon the length of the boom lever arms 54 and 55. In the boom illustrated in FIG. 2, it has a maximum reach of approximately 17 feet, 6 inches and the boom is illustrated in phantom in such position. At the maximum reach position, the felling head assembly is illustrated in three different positions. In the first position, the hydraulic cylinder assembly 64 is fully contracted and in such position the felling head assembly is tilted rearwardly as indicated at 80'. In a second position, the piston rod of the hydraulic cylinder assembly 64 is partially extended and the felling head assembly assumes a substantially vertical position as illustrated at 80''. When the piston rod of the hydraulic cylinder assembly 64 is fully extended, the felling head assumes the third position wherein it is substantially horizontal as indicated at 80'''. In the first position, the degree of opening of the jaws of the grapple may be readily observed by the operator and this is the normal position the felling head assembly would assume prior to the operator placing the grapple jaws around a vertically standing tree. In the second position, the felling head assembly is brought into a position to embrace a vertically disposed tree. After severing the tree, the felling head assembly may be pivoted to the third position where the tree is felled to the ground while remaining engaged by the grapple and thereafter the butt end lifted by the boom and grapple assembly onto the bunk 70.

The boom position is illustrated in solid line in FIG. 2 with the felling head assembly 80 in approximately the position it would assume in loading the tree onto the bunk. At the position illustrated, the grapple jaws of the feller head assembly may be opened and the butt end of the tree dropped by gravity vertically onto the bunk assembly 70 or alternatively placed gently thereon. A fourth position 80'''' is illustrated wherein the felling head assembly is supported on the vehicle carriage or frame 32. This fourth position is a position wherein the felling head assembly may be carried by the vehicle while the vehicle is being moved from one location to another.

The boom is illustrated in FIG. 5 reaching laterally or to one side of the vehicle. The boom is illustrated in the extended position in solid line and in phantom in a partially retracted position. There is a modification illustrated in FIG. 5 in that the hydraulic cylinder assembly 64 for effecting tilting of the felling head assembly is pivotally connected directly to the felling head rather than indirectly through a scissor arrangement as in the other embodiment. There is also a further modification and that is the provision of a supplemental mounting bracket 300 (see also FIG. 9) detachably secured to the free end of the boom intermediate the felling head and the boom. The felling head is pivotally mounted on the bracket 300 by a pin 301.

Secured to the boom section 55 in the proximity of the pivot pin 56 is a heeling device or abutment means 400 which, in FIG. 5, is illustrated on the boom drawn in phantom as it may be an alternative to the construction. As previously mentioned, the felling head consists of a grapple assembly having a pair of spaced jaws gripping the tree respectively, at a pair of spaced positions. A tree accordingly may be handled by the grapple for lifting and tilting controllably the tree up to a certain size. On large trees, however, the abutment or heeling device 400 may be used to engage the tree at a position spaced from the grapple. The tree thus supported may be readily maneuvered by the boom and grapple assembly. The heeling device or abutment means 400 consists of a bracket 401 rigidly secured as by welding or other means to the boom portion or leg 55 and a U-shaped cradle member 404 secured thereto. In FIG. 6, the bracket is illustrated as consisting of a pair of arms 402 and 403 anchored at one end to the boom section 55 as by welding. The U-shaped cradle portion 404 is anchored as by welding or some other means to the opposite end of the bracket members 402 and 403. The open portion of the U-shaped cradle is directed outwardly from the boom such that trees may be tilted by the grapple towards the boom and the tree thus tilted, nests between the upstanding or outwardly directed arms.

As previously mentioned, the vertical post or mast 52 of the boom is pivotally mounted on the rear carriage or frame 32 of the articulated vehicle. In referring to FIG. 3 of the drawings, there is illustrated a modified carriage including means for pivotally mounting the post. The post 52 is journaled in a box assembly 90 by a pair of vertically spaced journals 91 and 92. The box 90 includes an upper reinforced top wall 93, a lower wall 94 and an intermediate reinforced wall 95, all disposed in generally horizontal relation and interconnected at opposite edges by a pair of vertically disposed horizontally spaced walls 96. The journal 91 consists of a bronze shell inserted into a sleeve 97 secured to the top wall 93. The lower bearing 92 similarly consists of a bronze shell inserted into a sleeve 98 secured to the intermediate wall 95. A flange 99 is secured to and projects outwardly from the post 52 to overlap and bear against an end flange portion 91A of the bearing sleeve of journal 91. The collar or flange 99 thus provides a vertical support for the boom post or mast 52. The lower end of the mast 52 is covered by a cap 100 secured thereto and which bears against the lowermost edge of the journal 92 and the sleeve 98. The cap 100 thus prevents the post 52 from being vertically lifted or displaced from the sleeves 91 and 92.

Figure 4:
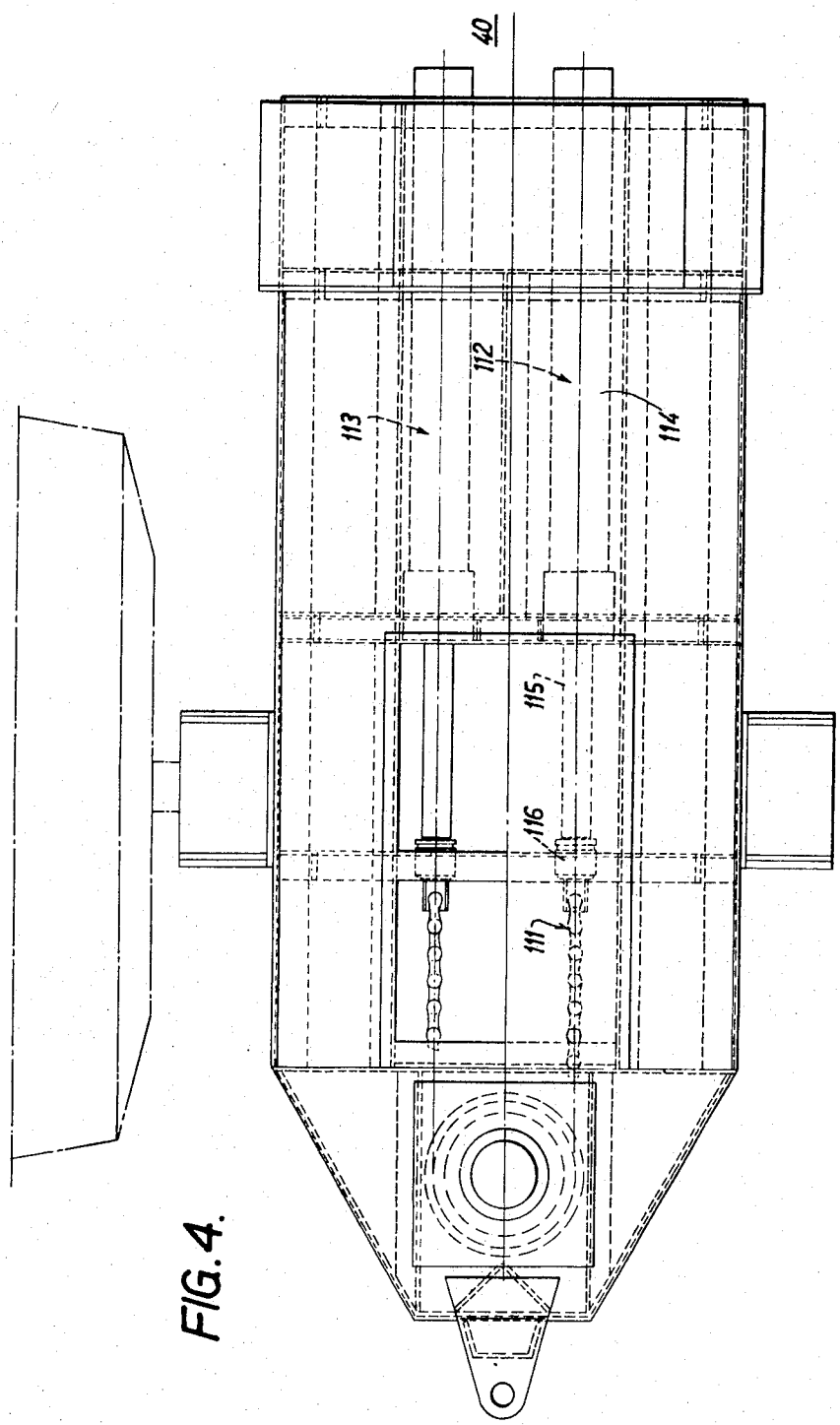
FIG. 4 is a partial top plan view of the chassis illustrated in FIG. 3 with the mast removed.

A sprocket 110 is secured to the mast or post 52 intermediate the journals 91 and 92. Slewing of the boom about the axis of the post 52 is effected by a link chain 111 anchored at opposite ends respectively to hydraulic cylinders 112 and 113 (see FIG. 4). The link chain entrains the sprocket 110 and extension and retraction of the hydraulic cylinder assemblies 112 and 113 accordingly, effects oscillation of the post about its vertical axis. Each of the hydraulic cylinder assemblies 112 and 113 includes a cylinder portion 114 secured to the frame 32 and a piston rod 115. The link chain 111 is anchored to the free end of the piston rods 115 by a suitable coupling member 116. In an alternative arrangement, the sprocket 110 may be replaced by a gear adapted to mesh with a rack (not shown) which replaces the link chain 111. The rack may be suitably connected to a hydraulic cylinder for oscillation along a selected path and thereby effect pivotal movement of the post by engagement of the rack with the teeth of the gear. In either embodiment, the hydraulic cylinder may be substantially parallel to the upper flat horizontal surface of the frame assembly 32. Such arrangement permits a relatively shallow frame.

The wheels 36 of the rear frame 32 may be driven through a drive shaft 130 connected at its forward end to a transmission (not shown) driven by the motor 39. The other end of the drive shaft 130 may be connected to a pinion meshing with a crown gear as in a normal drive for a vehicle. The drive shaft 130 consists of stub shafts 131 and 132 interconnected by a universal joint 133. The stub shaft 132 is supported by a bearing 135 mounted by a bracket 136 on the lower wall 94 of the box 90. The shaft 132 is connected to the differential or pinion and crown gear as the case may be, enclosed in the housing 137 by a further universal joint 138. The drive shaft portion 131 may be connected by a further universal joint 139 to a transmission driven by the motor 39. The wheels 36, secured to the front frame portion 31, also may be connected to the same transmission through a suitable drive shaft (not shown).

Figure 9:
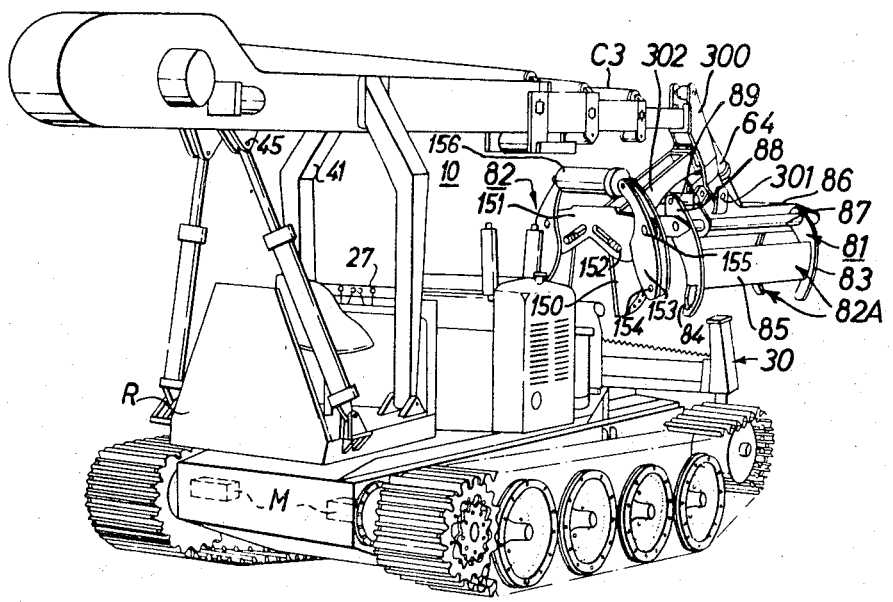

The felling head mechanism 80 consists of a grapple 81 and a shear 82, each of which are operated by hydraulic cylinders. Referring to FIG. 9, the grapple 81 consists of a pair of relatively movable jaws 82A, each of which consists of a pair of spaced arms 83 and 84 rigidly interconnected by a plate 85 and hingedly mounted on a frame 86 by a pin 87. The frame 86 is pivotally connected to the boom by the pin 80A. The arms 84 of each jaw have a rearwardly extending portion 88 and such extending portion of the two arms 84 is pivotally interconnected by a hydraulic cylinder 89.

The shear mechanism 82 is preferably detachably secured to the frame 86 and is disposed at a position in spaced relationship with respect to the grapple 81. The shear consists of a pair of relatively movable blades 150, each mounted on a frame 151 by a sliding pivot 152 and a lever 153. The lever 153 is pivotally secured to the respective blades by a pin 154 and to the frame 151, by a pin 155. The levers 153 include a rearwardly extending portion to which there is pivotally attached a hydraulic cylinder assembly 156. From a description to follow of the hydraulic circuitry, it will be seen that the hydraulic cylinders 89 and 156 effect operation respectively of the grapple jaws and the shear blades.

Figure 8:
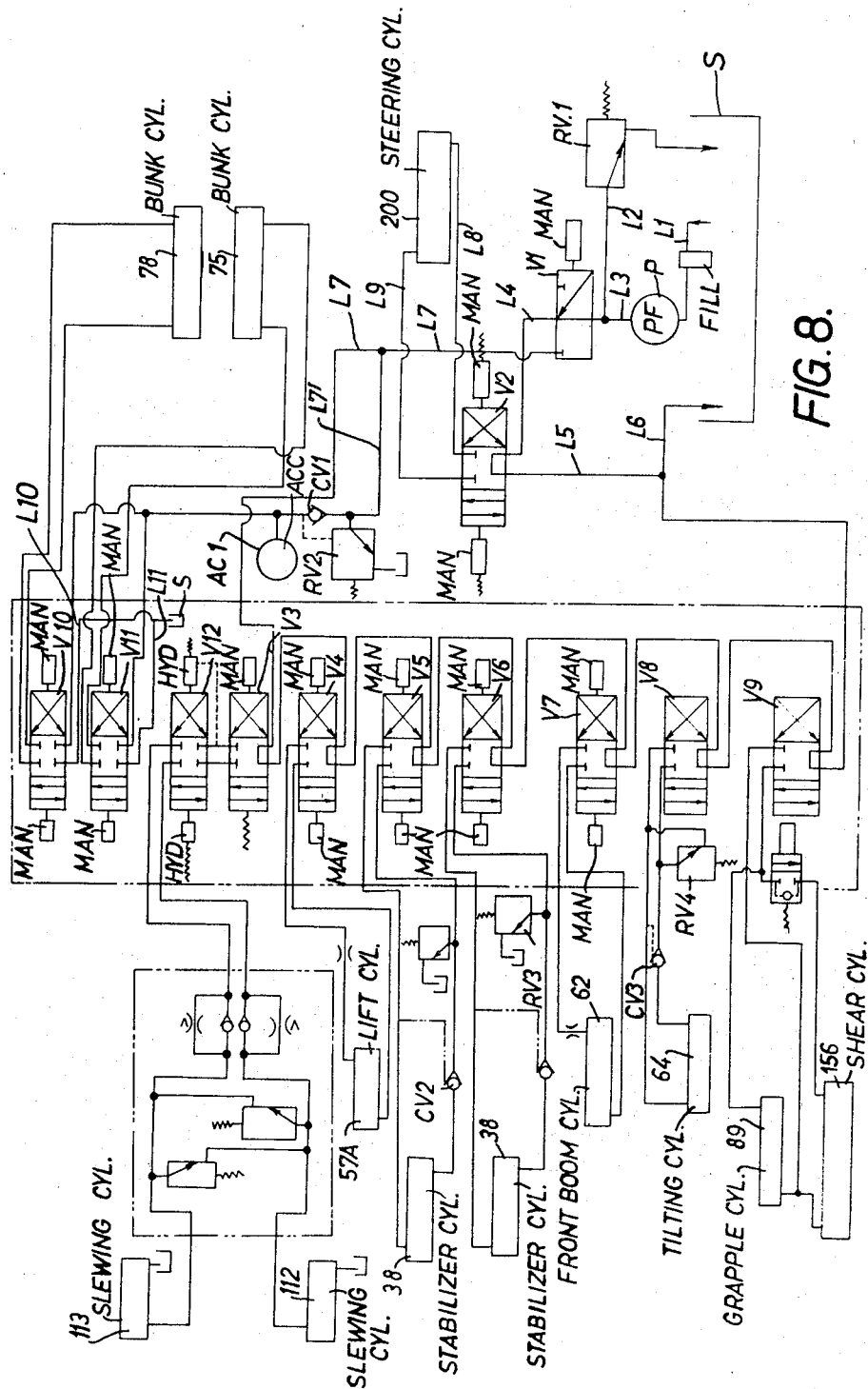
FIG. 8 is a schematic of the hydraulic system of the vehicle illustrated in FIG. 1; and, FIG. 9 is an oblique view of a modified log feller-skidder vehicle wherein the tractor portion is a track vehicle.

Referring now to FIG. 8, which is a schematic of the hydraulic system, there is an oil sump S from which a pump P draws oil through a line L1. The output from the pump may return to the sump by way of a line L2 through a pressure relief valve RV1 or alternatively, to a manually controlled valve V1 through a line L3. A line L4 connects the valve V1 to a further manually controlled valve V2 and continues on through the valve to provide a return to the sump S through lines L5 and L6. A further line L7 connects valve V1 and the valves V3 to V9 inclusive and returns to the sump through the line L6. The valve V2 is a two-position, manually controlled valve for controlling fluid to a double acting steering cylinder 200 through lines L8 and L9. Fluid under pressure from the pump P is supplied to manually controlled valves V10 and V11 through a line L7' branching from the line L7 intermediate the valves V1 and V3. A pressure relief valve RV2 is connected to the line L7' as is also an accumulator AC1. Intermediate the relief valve RV2 and accumulator AC1 is a check valve CV1. The valves V10 and V11 control respectively, bunk cylinders 75 and 78 and fluid returns to the sump S through respective lines L10 and L11. The valve V3 is a manual valve controlling actuation of a hydraulic valve V12 which, through a flow control and check valve, controls actuation of the slewing cylinders 112 and 113. The valve V4 is a manually operated valve used to control operation of the boom lift cylinder 57A. Valve V5 is a manually controlled valve as is also valve V6 which controls operation of respective ones of the pair of stabilizer cylinders 38. A check valve CV2 is located in each of the lines to the cylinder as is also a pressure relief valve RV3 returning to the sump S. The valve V7 is a manually operated valve used to control operation of the front boom cylinder 62 and the valve V8 controls operation of the felling head tilt cylinder 64. A check valve CV3 is located in the line from the cylinder 64 as is also a pressure relief valve RV4. The valve V9 is a solenoid actuated valve providing selective control of operation of the grapple cylinder 89 and the shear cylinder 156.

In the foregoing, there is disclosed an articulated vehicle equipped for use in felling and skidding trees. A modified vehicle is illustrated in FIG. 9 wherein the tractor portion is a track vehicle as disclosed in the aforementioned U.S. Pat. No. 3,227,295. The vehicle is hydraulically operated, the tracks being driven by individual hydraulic motors M, thereby providing means for steering the vehicle. A telescopic boom assembly 40A is mounted on a frame R adapted to pivot on the vehicle thereby providing slewing of the boom assembly. Secured to the free end of the innermost box section of the telescopic boom is the previously described felling head assembly 80 consisting of a grapple 81 and a shear 82 mounted on a common frame adapted to pivot with respect to the boom about a pin 301. In the embodiment illustrated in this figure, the felling head mounting bracket 301 has an abutment 302 projecting downwardly therefrom to engage the shear mechanism. The abutment strikes the shear frame 151 and thereby limits the horizontal disposition of the felling head providing a rest position for the latter during movement of the vehicle.

A hydraulic cylinder is provided for controlling the grapple and further hydraulic cylinder is provided for effecting actuation of the shear blades and a still further hydraulic cylinder is provided for tilting the felling head assembly relative to the boom. In each of the two embodiments, the felling head is mounted such that it may grasp vertical standing trees, or alternatively, grasp trees which have previously been felled and are lying on the ground.

In the foregoing description and in the accompanying drawings, the boom is mounted on the rear chassis of the vehicle. In an alternative embodiment, the boom assembly may be mounted by means of a suitable rotary mount on the roof or the cab of the vehicle. Such mounting places the entire boom assembly at a position vertically above the operator and also has the effect of placing the boom on the other chassis, that is, the one which does not have the bunk assembly mounted thereon.

I claim:

1. A vehicle adapted to fell standing trees, load the butt end of the felled trees onto the vehicle and skid the loaded trees, and thereafter, unload the trees from the vehicle comprising in combination:
   a. a mobile self-propelled unitary articulated vehicle;
   b. tree-handling and cutting means pivotally mounted on said vehicle to slew about a substantially vertical axis, said tree-handling and cutting means including an extendible and retractable boom having a felling head attached thereto adjacent the free end thereof for movement about a horizontal axis, said felling head comprising a grapple, having a jaw selectively to grasp a standing tree and a severing device to sever said standing tree at a position vertically below said grapple, said grapple and severing device being rigidly secured in fixed spaced relation relative to one another to a frame pivotally attached directly to said boom;
   c. an operator's station mounted on said vehicle and including control means for effecting operation of said vehicle and various components mounted thereon;
   d. a bunk mounted on said vehicle, said bunk including anchoring means comprising an upwardly facing jaw, controlled from said operator's station, for grasping positively to secure a tree or plurality of trees to said bunk and selectively release the same respectively to skid the trees and unload the same during forward movement of the vehicle; and
   e. means to pivot said felling head about the pivotal connection thereof to said boom, means to slew said tree-handling and cutting means about said vertical axis and means to extend and retract said boom to position said felling head at a vertical elevation above said bunk and the jaw thereof facing downwardly to transfer a tree therefrom onto said bunk.

2. A tree feller, self-loading, self-unloading skidder machine as defined in claim 1 wherein said severing device comprises a shear.

3. A feller skidder as defined in claim 1 wherein said bunk includes a plurality of arms pivotally secured thereto at horizontally spaced positions for anchoring at least one layer of trees thereon and thereby providing a platform to support further trees.

4. A machine as defined in claim 1 wherein said boom is a knuckle boom.

5. A machine as defined in claim 1 wherein said boom is a knuckle boom mounted on a chassis of the articulated vehicle common to the chassis on which the bunk is mounted.

6. A machine as defined in claim 1 wherein said bunk comprises a generally horizontal rigid support member having a plurality of arms pivotally secured thereto in spaced relation longitudinally therealong, said arms acting in pairs to anchor a plurality of trees or groups of trees to said bunk.

7. A machine as defined in claim 1 wherein said bunk is pivotally mounted for movement about a substantially vertical axis.

8. A log-handling vehicle as defined in claim 1 wherein said articulated vehicle includes a front chassis and a rear chassis pivotally interconnected and wherein the boom and bunk are mounted on the rear chassis and a prime mover and operator's station are mounted on said front chassis.

* * * * *

UNITED STATES PATENT OFFICE
CERTIFICATE OF CORRECTION

Patent No. 3,630,246     Dated December 28, 1971

Inventor(s) Douglas D. Hamilton

It is certified that error appears in the above-identified patent and that said Letters Patent are hereby corrected as shown below:

On the first or front page of this patent in the left hand column between the paragraphs numbered [73] and [54], the following numbered paragraph was omitted and therefore should appear as follows:

[30] FOREIGN APPLICATION PRIORITY DATA

January 6, 1967    Canada    979,736

Signed and sealed this 30th day of January 1973.

(SEAL)
Attest:

WARD M. FLETCHER, JR.
Attesting Officer

ROBERT GOTTSCHALK
Commissioner of Patents